(12) United States Patent
Shin

(10) Patent No.: US 7,416,161 B2
(45) Date of Patent: Aug. 26, 2008

(54) CUP HOLDER FOR VEHICLE

(75) Inventor: Je Hoon Shin, Yongin (KR)

(73) Assignees: Hyundai Motor Company, Seoul (KR); Dongkook Ind. Co., Ltd., Ulsan (KR)

( * ) Notice: Subject to any disclaimer, the term of this patent is extended or adjusted under 35 U.S.C. 154(b) by 267 days.

(21) Appl. No.: 11/204,572

(22) Filed: Aug. 16, 2005

(65) Prior Publication Data

US 2006/0032856 A1    Feb. 16, 2006

(30) Foreign Application Priority Data

Aug. 16, 2004  (KR) .................. 10-2004-0064195

(51) Int. Cl.
*A47K 1/08* (2006.01)
(52) U.S. Cl. .................. 248/311.2; 224/282; 224/926
(58) Field of Classification Search ............. 248/311.2; 224/483, 282, 926
See application file for complete search history.

(56) References Cited

U.S. PATENT DOCUMENTS 5,618,018 A * 4/1997 Baniak .................. 248/311.2
5,857,633 A * 1/1999 Pelchat et al. ............. 248/311.2
6,637,709 B1 * 10/2003 Guenther et al. ......... 248/311.2
6,655,563 B2 * 12/2003 Shimajiri .................... 224/282
6,712,325 B2 * 3/2004 Choi ........................ 248/311.2

FOREIGN PATENT DOCUMENTS

JP        2004-196293    *   7/2004

* cited by examiner

*Primary Examiner*—Amy J. Sterling
(74) *Attorney, Agent, or Firm*—Morgan Lewis & Bockius LLP

(57) ABSTRACT

According to an embodiment of the present invention, a cup holder for a vehicle includes a main body defining an insertion hole that can receive a beverage container, a supporting portion supporting the beverage container and mounted in an inner hole of the main body such that the supporting potion can rotate and move back and forth by a hinge pin guided along a guide groove formed in a lateral side of the inner hole, and a pair of compression springs supporting the supporting portion such that the supporting portion can elastically protrude to the insertion hole. As the hinge pin moves according to the shape and size of the beverage container, the beverage container can be strongly supported such that the beverage can not be spilt from the beverage container regardless of a shape and size thereof when the beverage container is inserted.

2 Claims, 9 Drawing Sheets

CUP HOLDER FOR VEHICLE

CROSS-REFERENCE TO RELATED APPLICATION

This application claims priority to and the benefit of Korean Patent Application 10-2004-0064195 filed in the Korean Intellectual Property Office on Aug. 16, 2004, the entire content of which is incorporated herein by reference.

BACKGROUND OF THE INVENTION (a) Field of the Invention

The present invention relates to a cup holder for a vehicle. More particularly, the present invention relates to a cup holder for a vehicle that can be used with variable beverage containers, that softly supports a motion of the beverage container, and that is stable to the user.

(b) Description of the Related Art

Generally, a cup holder that can receive a beverage container, such as a beverage cup or can, is formed to a console box or a back side of a seat back. On the other hand, a portable cup holder that can be carried by an occupant is disposed to a predetermined location of the vehicle. An opened insertion hole is formed in the cup holder such that the beverage container can be disposed thereinto or be drawn out therefrom. However, a prior cup holder can sometimes only hold a cup or can that has a predetermined shape and size which corresponds to the cup holder. Therefore, there are problems that noise or vibration may occur during driving the vehicle because of a gap between the cup holder and beverage container and that beverage may spill from the beverage container during the vehicle driving. Although some attempts have been made to provide cup supporting members that are elastic or spring operated, these have been generally inadequate.

SUMMARY OF THE INVENTION

The present invention has been made in an effort to provide a cup holder for a vehicle having advantages of easily inserting/drawing out a beverage container. An exemplary cup holder for a vehicle according to an embodiment of the present invention includes a main body defining an insertion hole that can receive a beverage container, a supporting portion supporting the beverage container and mounted in an inner hole of the main body such that the supporting portion can rotate and move back and forth by a hinge pin guided along a guide groove formed in a lateral side of the inner hole, and a pair of compression springs supporting the supporting portion such that the supporting portion can elastically protrude to the insertion hole. A front portion of the supporting portion protrudes as a curved surface. An upper end of the supporting portion is rotatably secured to an upper end of the inner hole such that the supporting portion can not be separated from the inner hole. An inner portion of the supporting portion has an empty space such that the compression springs can be at least partially inserted therein. A front portion and a rear portion of the compression springs are respectively connected to an inner surface of the supporting portion and a fixing portion formed in the inner hole of the main body of the cup holder.

DETAILED DESCRIPTION OF THE EMBODIMENTS

An embodiment of the present invention will hereinafter be described in detail with reference to the accompanying drawings.

Figure 1:
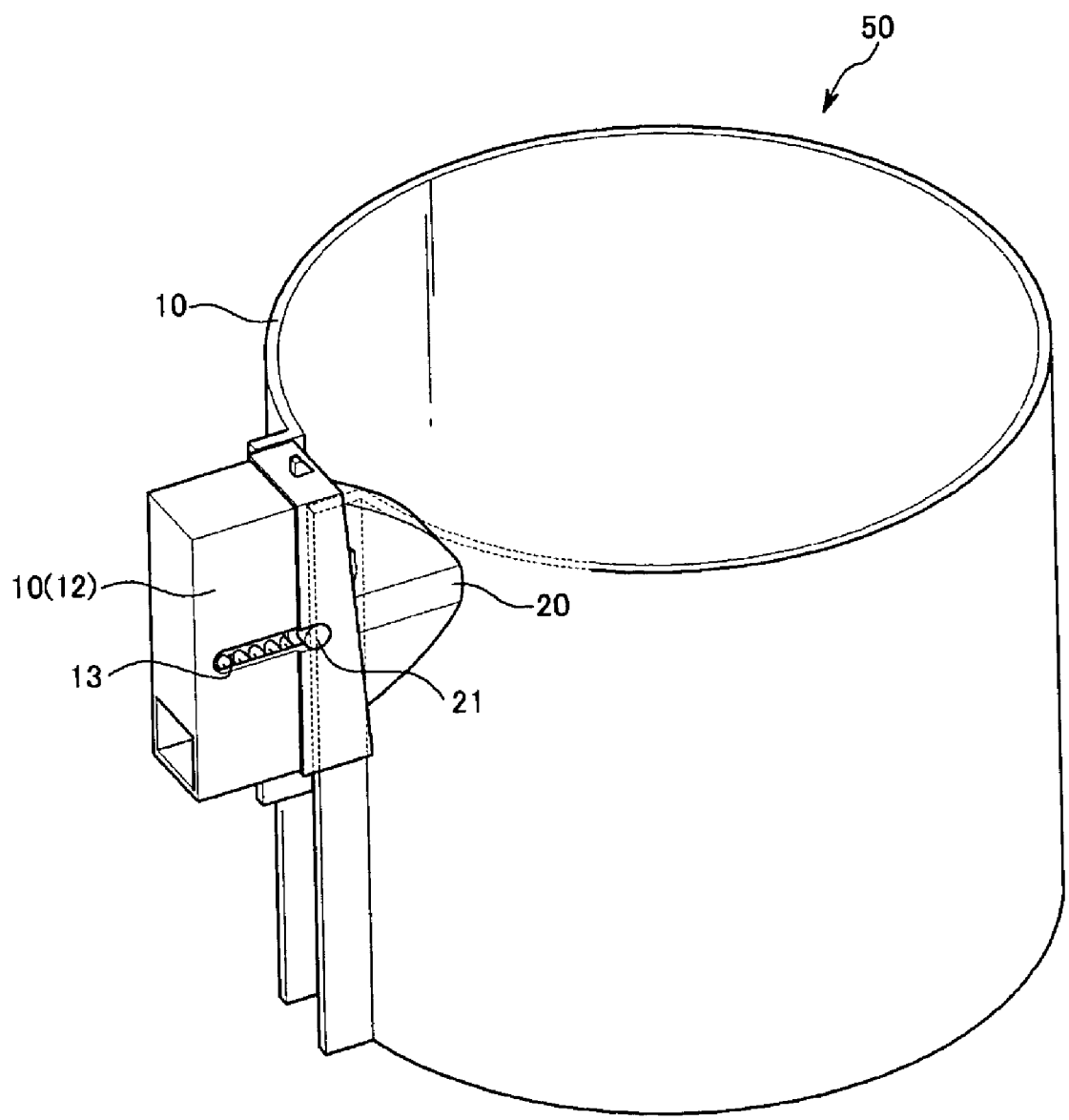
FIG. 1 and FIG. 2 are perspective views showing a cup holder for a vehicle according to a first exemplary embodiment of the present invention.
Figure 2:
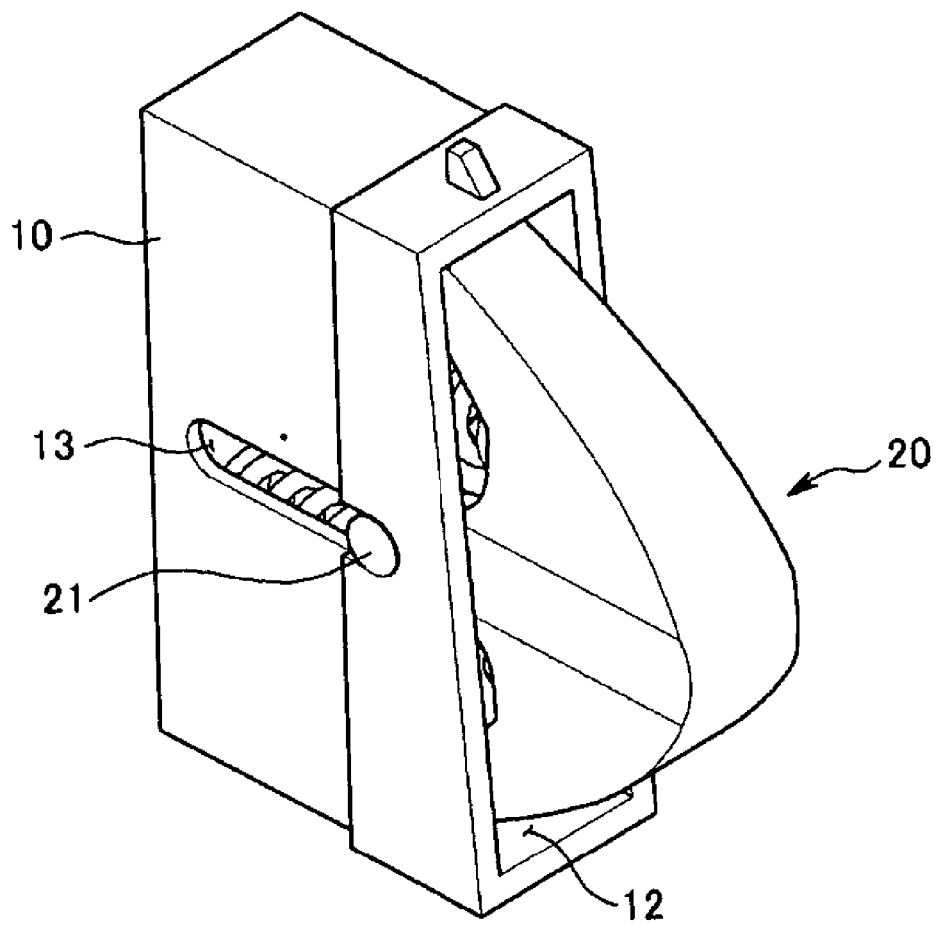
Figure 3A:
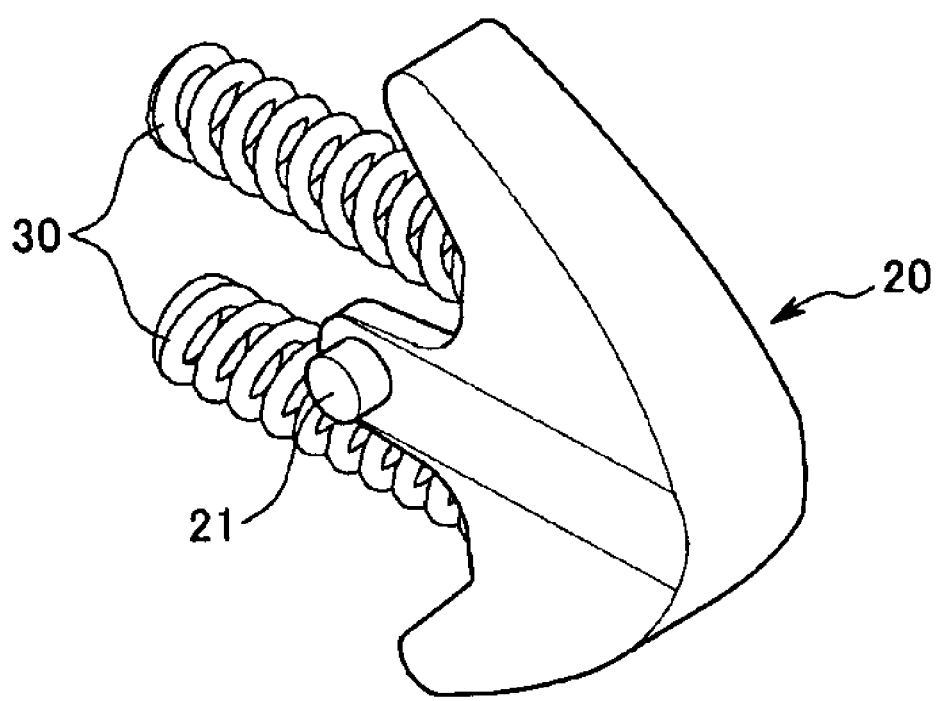
FIG. 3A and FIG. 3B are perspective views showing a supporting portion of the cup holder for a vehicle according to the first exemplary embodiment of the present invention.
Figure 3B:
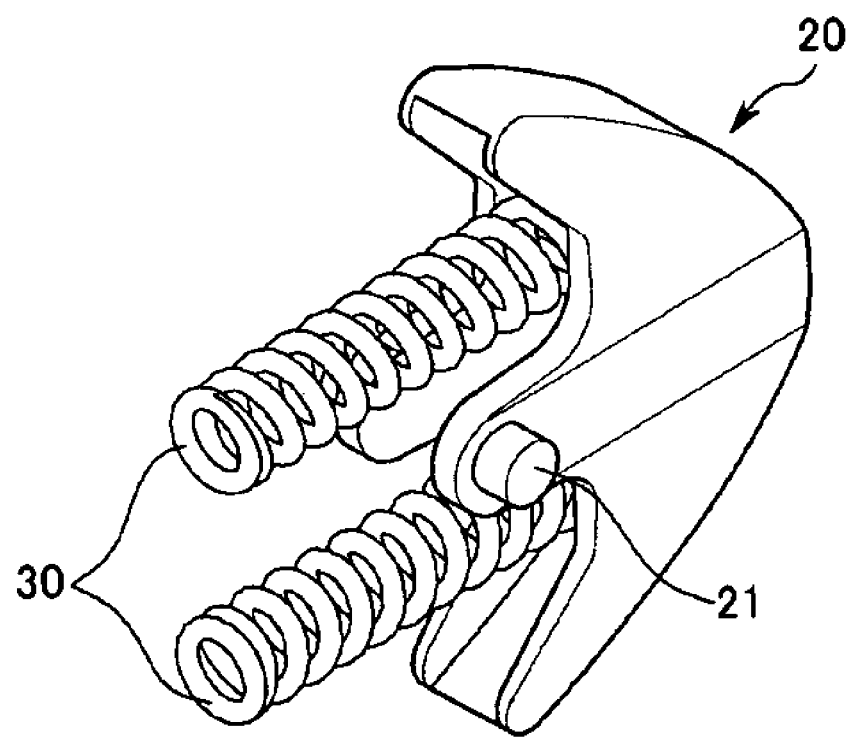
Figure 4A:
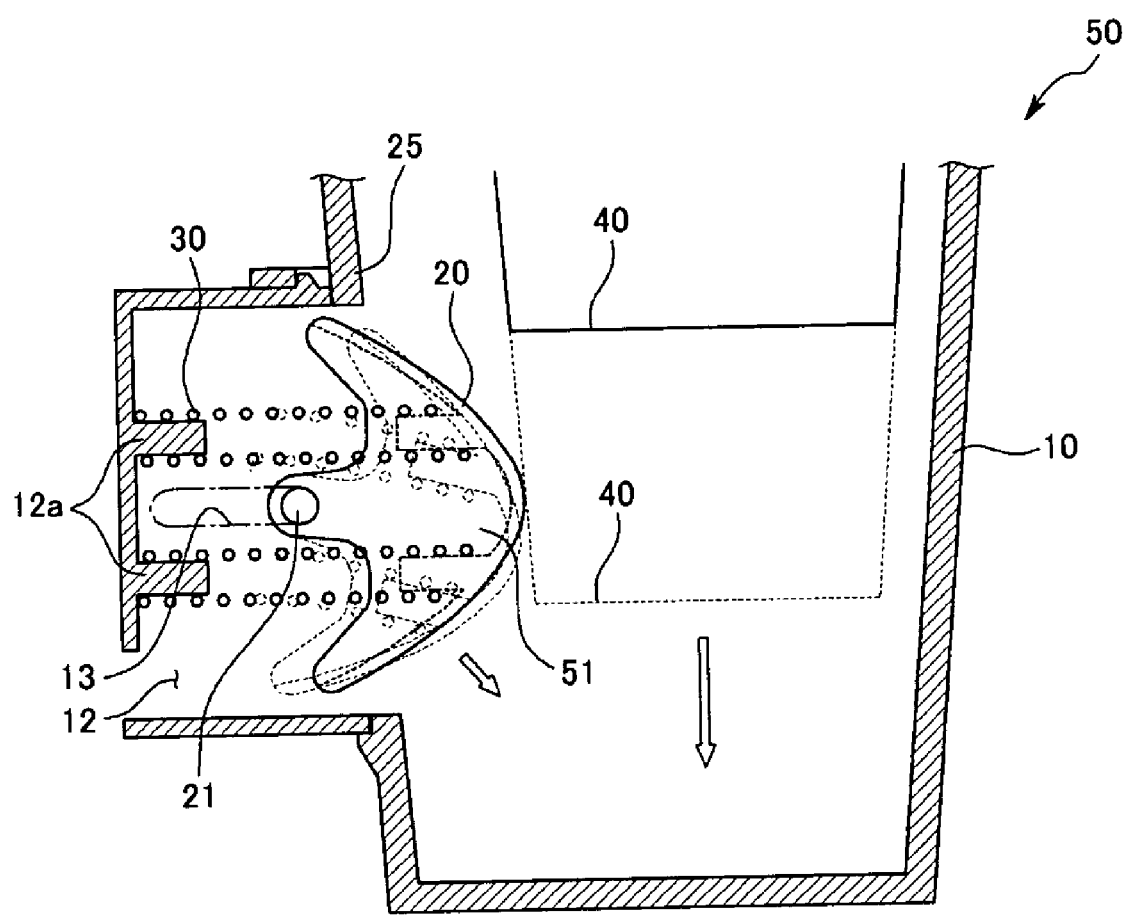
FIG. 4A to FIG. 4C show an operating state of the cup holder for a vehicle according to the first exemplary embodiment of the present invention.
Figure 4B:
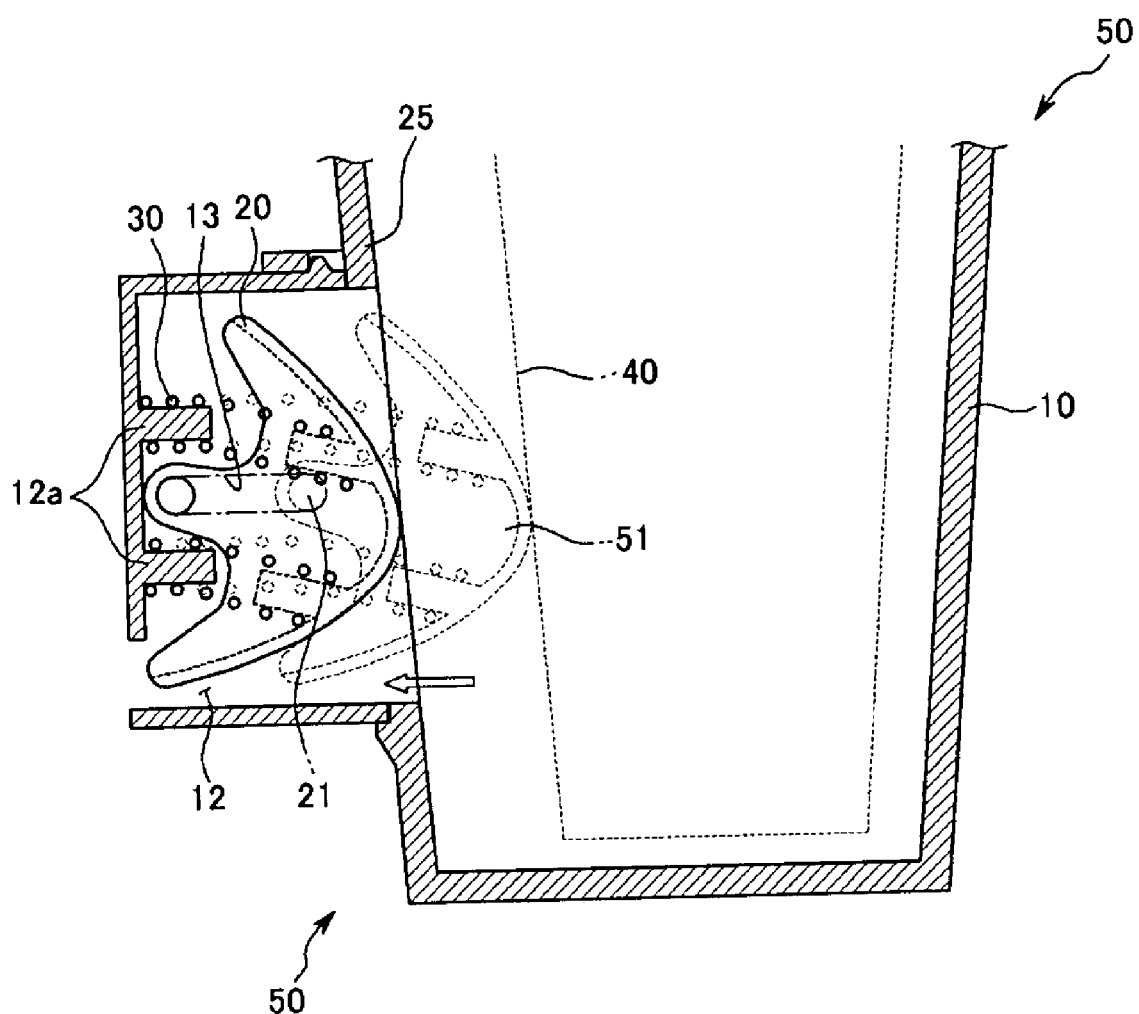
Figure 4C:
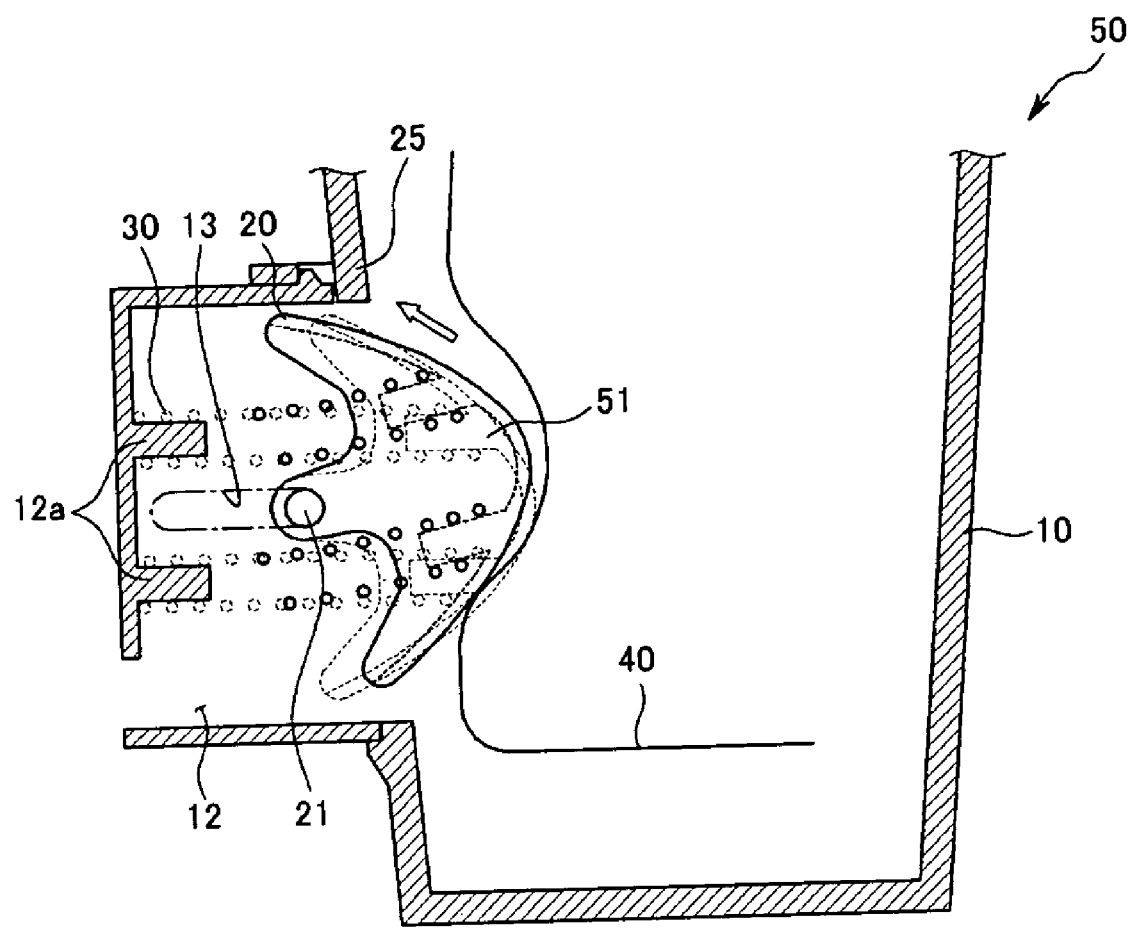

FIG. 1 and FIG. 2 are perspective views showing a cup holder for a vehicle according to an first exemplary embodiment of the present invention, FIG. 3A and FIG. 3B are perspective views showing a supporting portion of the cup holder for a vehicle according to the first exemplary embodiment of the present invention, and FIG. 4A to FIG. 4C show an operating state of the cup holder for a vehicle according to the first exemplary embodiment of the present invention.

As shown in FIG. 1 to FIG. 4C, a cup holder 50 includes a main body 10 defining an insertion hole 11, of which an upper portion is open, that can receive a beverage container 40.

In addition, a supporting portion 20 that supports the beverage container 40 and is mounted in the inner hole 12 of the main body 10 is disposed to the main body 10 by a hinge pin 21.

A pair of compression springs 30 are mounted such that the compression springs 30 support the supporting portion 20 between the supporting portion 20 and the inner hole 12.

Referring to FIG. 1, according to the first exemplary embodiment of the present invention, one supporting portion 20 is mounted to the main body 10 but more supporting portion 20 may be mounted thereto.

The supporting portion 20 elastically protrudes by the compression springs 30 at a state that the supporting portion 20 is located in the inner hole 12.

In addition, the supporting portion 20 is formed such that the supporting potion 20 can rotate and move back and forth by the hinge pin 21 guided along a guide groove 13 formed in both lateral sides of the inner hole 12.

According to the first exemplary embodiment of the present invention, a front portion 51 of the supporting portion 20 protrudes as a curved surface and an inner portion of the supporting portion 20 has an empty space such that the compression springs 30 can be at least partially inserted therein.

In addition, the hinge pin 21 formed with the supporting portion 20 as one body is inserted to a guide groove 13 formed to both lateral sides of the supporting portion 20.

Therefore, the supporting portion 20 can move along a predetermined course, i.e., the supporting portion 20 can move along the guide groove 13 in a horizontal direction.

A front portion and a rear portion of the compression springs 30 are respectively connected to an inner surface of the supporting portion 20 and a fixing portion 12a formed in the inner hole 12 of the main body 10 of the cup holder 50.

The compression springs 30 elastically support the supporting portion 20 by their elastic restoring force.

In a case that a force operates to an upper surface portion of the supporting portion 20, the supporting portion 20 is inserted or pushed into the inner hole 12 of the main body 10 by elastically rotating on the basis of the hinge pin 21.

In other words, in the case that the first operating force operates, the supporting portion 20 rotates to a predetermined position on the basis of the hinge pin 21 in contacting the curved surface of the supporting portion 20 with a surface of the beverage container 40.

In this case, the supporting portion 20 elastically rotates by the compression springs 30.

And then, in a case that a second operating force operates by the surface of the beverage container 40, the supporting portion 20 can be moved backward elastically and the hinge pin 21 is also guided backward along the guide groove 13.

As a result, the supporting portion 20 is inserted into the inner hole 12.

Figure 5A:
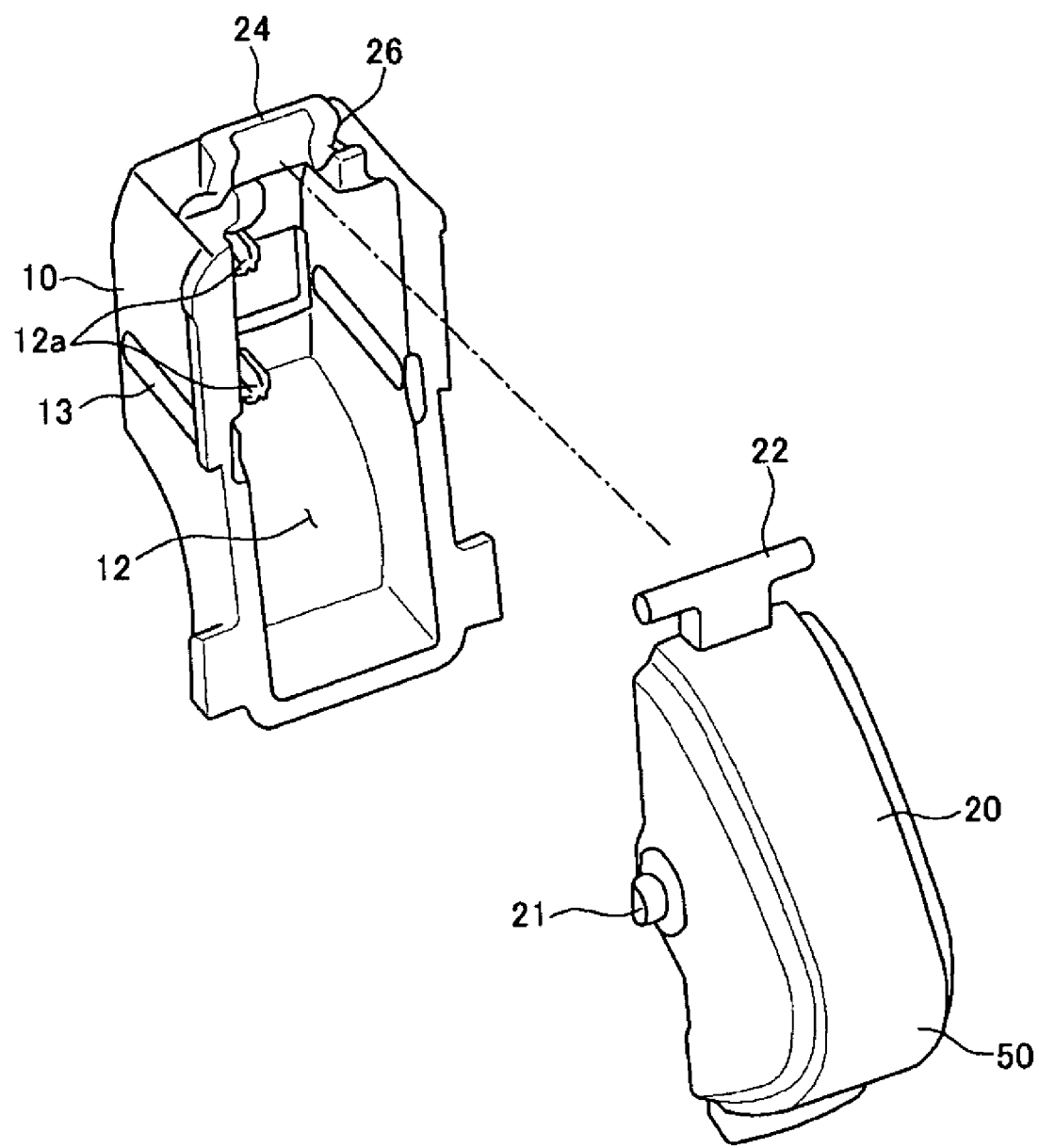
FIG. 5A and FIG. 5B show a cup holder for a vehicle according to another exemplary embodiment of a second present invention.
Figure 5B:
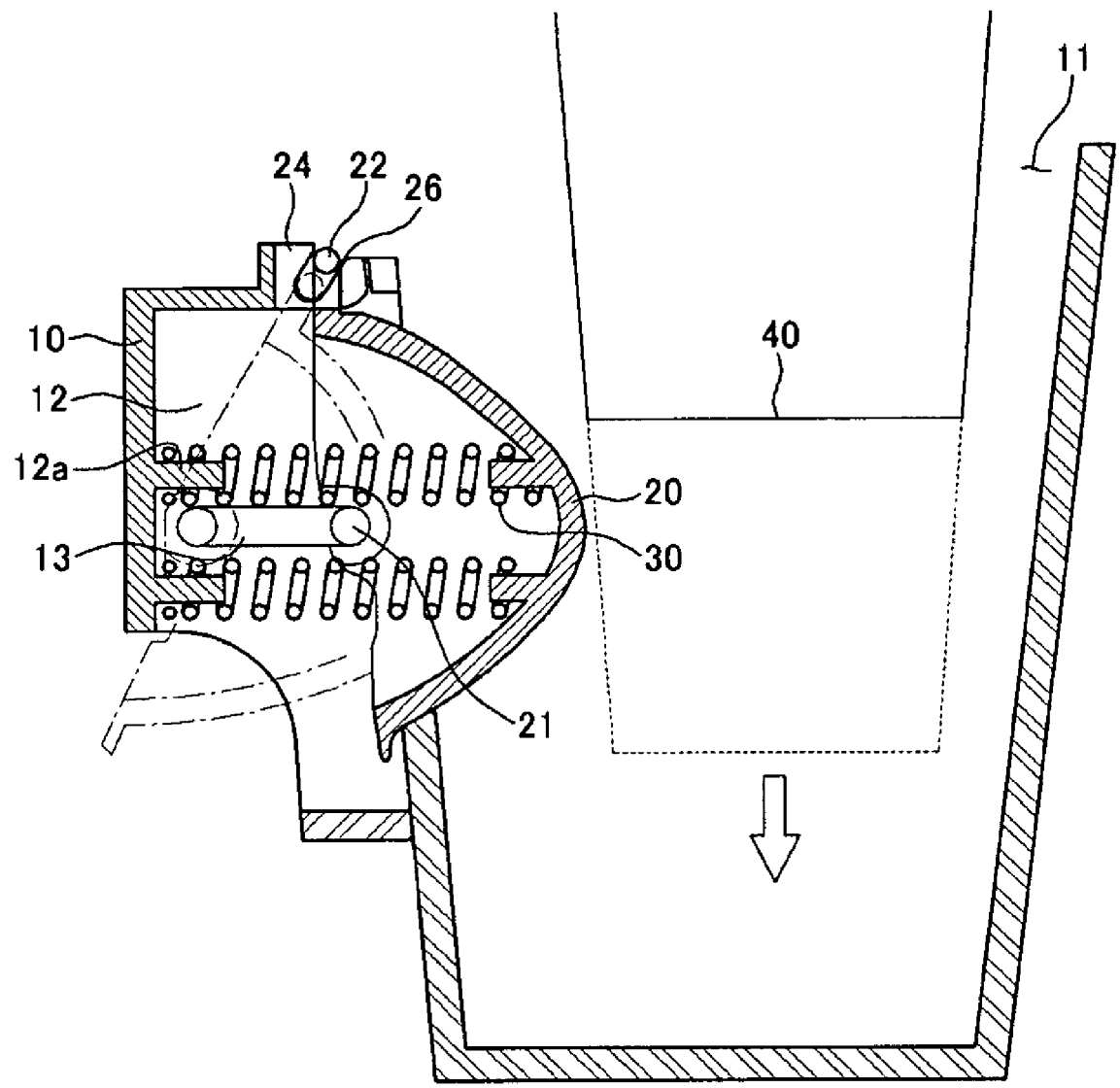

FIG. 5A and FIG. 5B show a cup holder for a vehicle according to a second exemplary embodiment of the present invention.

Referring to FIG. 5A and FIG. 5B, according to a second exemplary embodiment of the present invention, an upper end 22 of the supporting portion 20 is rotatably secured to an upper end 24 of the inner hole 12 such that the supporting portion 20 can not be separated from the inner hole 12.

As shown in FIGS. 5A and 5B, if the protruded upper end 22 of the supporting portion 20 is rotatably secured to the upper end 24 of the inner hole 12, the supporting portion 20 may not be separated to an outside of the inner hole 12.

More particularly, the protruded upper end 22 of the supporting portion 20 is inserted to the groove 26 of the upper end 24 of the inner hole 12. Therefore, referring to dotted lines in FIG. 5B, if the beverage container 40 is inserted to the insertion hole 11, the supporting portion 20 is inserted to an inner space of the inner hole 12 by rotating at a direction of counterclockwise.

According to the second exemplary embodiment of the present invention, because the upper end 22 of the supporting portion 20 is rotatably secured to the upper end 24 of the inner hole 12, although excessive force is urged to the supporting portion 20, the supporting portion 20 can not be separated from the inner hole 12.

Referring to FIG. 4A to FIG. 4C, according to an exemplary embodiment of the present invention, an operation of the cup holder for a vehicle is described hereinafter.

In a case that a beverage container 40 is not inserted into the insertion hole 11, the supporting portion 20 protrudes at a direction of the middle of the insertion hole 11 formed in the cup holder 50.

In a case that the front portion 51 of the support portion 20 is pushed by a weight of a beverage container 40 which is inserted into the cup holder 50, the supporting portion 20 elastically rotates on the basis of the hinge pin 21 (referring to a dotted line and an arrow in FIG. 4A).

And then, the hinge pin 21 forming one body with the supporting portion 20 moves along the guide groove 13 by the surface of the beverage container 40.

As a result, the supporting portion 20 elastically moves backwards to an inner surface of the inner hole 12 of the main body 10 of the cup holder 50 (referring to a dotted line and arrow in FIG. 4B).

Particularly, as shown in FIG. 4C, in a case that a user draws out a beverage container 40 having a concave portion from the insertion hole 11, because the front portion 51 of the supporting portion 20 rotates along a concave surface of the beverage container 40, the beverage container 40 can be easily drawn out (referring to a dotted line and arrow in FIG. 4C).

According to the cup holder for a vehicle of the present invention, a user can use the cup holder comfortably and variable beverage containers can be used.

In addition, a supporting motion of the supporting member is flexible.

As described above, according to the cup holder of the present invention, in a case that the first operating force operates when a beverage container is inserted, the supporting portion elastically rotates to the predetermined position on the basis of the hinge pin.

And then, in a case that the second operating force operates along the surface of the beverage container, the supporting portion 20 can be moved backward elastically and the supporting portion moves back to an original position by a force of the compression springs when the beverage container is drawn out.

Therefore, a beverage container can be strongly supported such that the beverage can not be spilt from the beverage container regardless of a shape and size thereof when the beverage container is inserted because the hinge pin elastically moves along the beverage container and the beverage container can be easily drawn out.

While this invention has been described in connection with what is presently considered to be the most practical exemplary embodiment, it is to be understood that the invention is not limited to the disclosed embodiment, but, on the contrary, is intended to cover various modifications and equivalent arrangements included within the spirit and scope of the appended claims.

What is claimed is:

1. A beverage container holder for a vehicle comprising:
    a body defining an insertion hole for receiving a beverage container and an adjacent inner hole open to the insertion hole, the body further defining two spaced-apart horizontal grooves;
    a container supporting member rotatably mounted to the body and having a wedge-shaped front portion for abutting a beverage container, the supporting member protruding at least partially into the insertion hole for contacting a container and being at least partially retractable from the insertion hole into the inner hole;
    at least one pin received in the horizontal grooves of the body and rotatably connecting the supporting member to the body, the pin defining a rotational axis for the supporting member; and
    two biasing members biasing the support towards the insertion hole,
    wherein in response to inserting and removing a beverage container from the insertion hole, the supporting member is rotatably movable upwards and downwards about the rotational axis and is further movable in an axial horizontal direction with respect to the insertion hole.

2. The beverage container holder of claim 1, further comprising an upper end of container support being pivotally mounted to the housing body, the upper end having a pin received in a groove disposed in the housing body at an angle to the horizontal groove.

* * * * *